(12) United States Patent
Wallmeier

(10) Patent No.: US 8,829,711 B2
(45) Date of Patent: Sep. 9, 2014

(54) MODULAR POWER SUPPLY ARRANGEMENT

(75) Inventor: Peter Wallmeier, Lippstadt (DE)

(73) Assignee: AEG Power Solutions B.V., Zwanenburg (NL)

( * ) Notice: Subject to any disclaimer, the term of this patent is extended or adjusted under 35 U.S.C. 154(b) by 149 days.

(21) Appl. No.: 12/781,088

(22) Filed: May 17, 2010

(65) Prior Publication Data

US 2011/0169332 A1     Jul. 14, 2011

(30) Foreign Application Priority Data

Jan. 14, 2010    (EP) .................................. 10150728

(51) Int. Cl.
| | |
|---|---|
| *H02J 3/00* | (2006.01) |
| *H02M 5/22* | (2006.01) |
| *H02J 3/38* | (2006.01) |

(52) U.S. Cl.
CPC ... *H02M 5/22* (2013.01); *H02J 3/38* (2013.01)
USPC .................. 307/52; 307/17; 307/43; 307/72; 307/73; 307/75; 307/83

(58) Field of Classification Search
CPC ....................................................... H02J 3/00
USPC ........................ 307/75, 17, 43, 52, 72, 73, 83
See application file for complete search history.

(56) References Cited

U.S. PATENT DOCUMENTS

| | | | |
|---|---|---|---|
| 8,330,302 B2 * | 12/2012 | Wallmeier et al. ............ | 307/151 |
| 2006/0061295 A1 | 3/2006 | Voilmar et al. | |
| 2007/0273213 A1 * | 11/2007 | Wang et al. ..................... | 307/66 |
| 2010/0231039 A1 * | 9/2010 | Wallmeier et al. .............. | 307/17 |
| 2012/0275200 A1 * | 11/2012 | Bajan et al. ..................... | 363/36 |
| 2013/0020869 A1 * | 1/2013 | Wallmeier ....................... | 307/18 |
| 2013/0323136 A1 * | 12/2013 | Averberg ....................... | 422/199 |
| 2013/0323137 A1 * | 12/2013 | Averberg ....................... | 422/199 |

FOREIGN PATENT DOCUMENTS

| | | |
|---|---|---|
| DE | 20 2004 014 512 U1 | 11/2004 |
| DE | 202004014812 U1 | 11/2004 |
| DE | 20 2009 003 325 U1 | 6/2009 |

(Continued)

OTHER PUBLICATIONS

AEG: Control Your Power. Thyro-Family, Thyristor-Leistungssteller -S, -A, -P Dec. 31, 2009.

(Continued)

*Primary Examiner* — Adi Amrany
(74) *Attorney, Agent, or Firm* — Cohen & Hildebrand, PLLC

(57) ABSTRACT

A power supply arrangement for producing polysilicon with a central control unit and a basic supply unit, which are regulated and controlled by control means. The basic supply unit supplies the supply module with electric energy, an output for connecting to loads which are supplied with electric energy from the mains via basic supply unit, and controllable switches, which are connected to the input and to the output and which are configured for adjusting the energy to be supplied to the loads. The switches are controllable. The control unit is supplied with electric energy. The power supply includes a communication bus. The control module and the basic supply module are connectable to the control module and the basic supply module to the communication bus. The control module and the basic supply module provide connections to the control module and the basic supply module to the communication bus.

32 Claims, 3 Drawing Sheets

(56) References Cited

FOREIGN PATENT DOCUMENTS

Figure 1A:
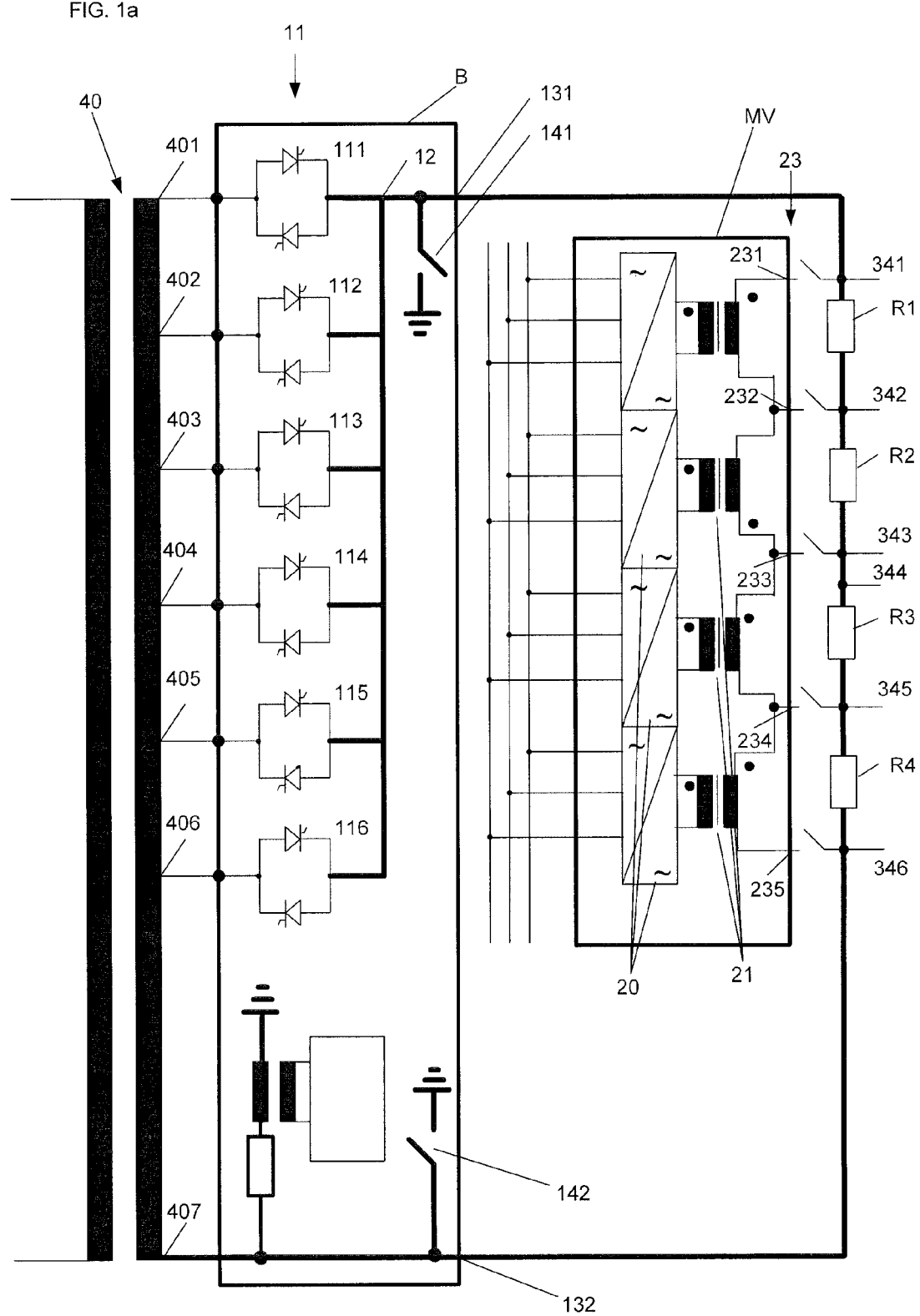

| EP | 1150419 | A2 | 10/2001 |
|----|---------|----|---------|
| EP | 2100851 | A2 | 9/2009 |
| SU | 547943 | A1 | 2/1977 |

OTHER PUBLICATIONS

European Search Report for correspondence EP Application No. 10150728.3 dated Jul. 19, 2010.

* cited by examiner

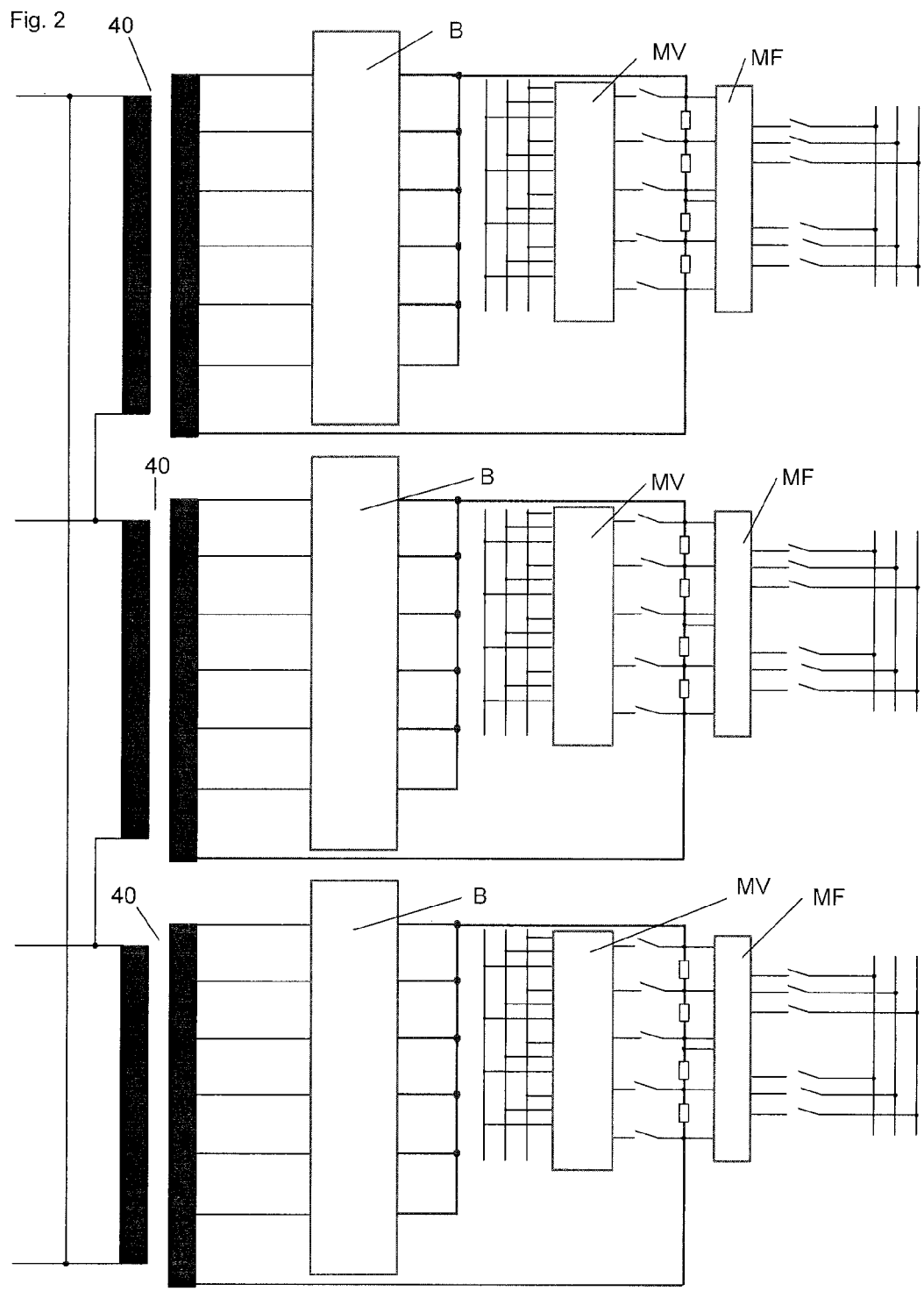

MODULAR POWER SUPPLY ARRANGEMENT

BACKGROUND OF THE INVENTION (1) Field of the Invention

The present invention relates to a power supply arrangement, in particular for reactors for producing polysilicon, with a control unit and at least one basic supply unit, wherein the control unit comprises at least one control and regulating means for controlling and/or regulating the basic supply unit, the basic supply unit comprises, at least one input for connection to a power mains for supplying electric energy, at least one output for connecting with a group of loads which can be supplied via the basic supply unit with electric energy from the power mains, and controllable switches, preferably thyristors, which are connected at least indirectly with the input and at least indirectly with the output and which are configured for adjusting the energy to be supplied to the loads via the output, wherein the switches can be controlled by the control unit.

(2) Description of Related Art

A power supply arrangement of this type is known, for example, from the document DE 20 2004 014 812 U1. The utility model discloses a power supply arrangement with a basic supply unit which can be used to supply an electric voltage to loads connected in series to the power supply arrangement. A portion of the loads can be supplied in parallel with a medium voltage from a medium voltage supply unit. The control unit is not described in detail in this document. In particular, it is not disclosed how the control unit acts on the controllable switches of the basic supply unit or the medium voltage supply unit.

DE 20 2009 003 325 U1 also describes a power supply arrangement with a basic supply unit and a medium voltage supply unit, wherein the basic supply unit is not described in detail. A control unit is also mentioned in the document, but not described in detail.

Another disadvantage of this type of power supply arrangement as well as of other power supply arrangements is that they are built individually and to order. Each power supply is hence an individual solution for a particular power supply problem, although experiences from prior solutions can be relied upon.

BRIEF SUMMARY OF THE INVENTION

It is an object of the invention to improve a power supply arrangement of the aforedescribed type such that starting with a simple power supply arrangement with a control unit and a basic supply unit, the power supply arrangements can be flexibly adapted without requiring a new design for a particular solution.

This object is attained by the invention in that the control unit is a control module and the basic supply unit is a basic supply module, that the control module has an input for connection to the power mains for supplying the control module with electric energy, that the power supply arrangement includes a communication bus, and that both the control module and the basic supply module include an interface configured for connecting the control module and the basic supply module to the communication bus.

A modular power supply arrangement according to the invention can be flexibly expanded from an arrangement with a control module and a basic supply module. These expansions may include, for example, additional basic supply modules which may optionally be added later to form a power supply arrangement. The modules to be added are connected to the control module via interfaces and the communication bus to enable control or regulation by the control module. In addition, the modules have dedicated inputs for connection to the power mains. The power supply arrangement of the invention is therefore easily scalable. Accordingly, the power supply arrangement according to the invention can be adapted to the practical application of producing polysilicon with the Siemens process by, for example, matching the number of basic supply modules to the number of the thin silicon rods to be supplied with power. Optionally, modules can be also be added later to a power supply arrangement for supplying power to a polysilicon reactor operating according to Siemens process to improve process control. A manufacturer of current supply arrangements or a polysilicon manufacturer can thereby flexibly adapt a facility with Siemens reactors to changing conditions, for example prices for raw material, energy or polysilicon, or changing demand.

The power supply arrangement may include a transformer with several secondary-side taps, wherein each tap of the transformer may be associated with one input. A group of the controllable switches may be associated with each input of the basic supply module for adjusting via this tap the electric energy to be withdrawn from the power mains. The controllable switches may be, for example, thyristors. The groups of the controllable switches may advantageously be connected without the interconnection of additional switches with, on one hand, the taps and, on the other hand, with the output of the basic supply module. Advantageously, in addition to the controllable switches of the aforementioned group, no additional switch, in particular no mechanical high-current switch for safe disconnection, such as a contactor, are disposed in the current path between the tap and the output.

However, a node may be provided between the groups of the controllable switches and the output. The node may be connected to a reference potential via an additional controllable switch. In this way, the output of the basic supply module can be grounded and short-circuited via ground. This may be desirable if the loads connected to the output of a basic supply module are supplied with electric energy in other ways. Preferably, a basic supply module according to the invention has an interlock which ensures that either a controllable switch of one of the groups of the controllable switches or the additional controllable switch are closed for connection to the reference potential. In this way, simultaneous supply of electric energy from the basic supply module and from other sources to the loads connected to the output of the basic supply module can be prevented.

At the output of a basic supply module, loads can be supplied with AC voltages of 0 V to 3000 V, preferably to 2500 V, and with AC currents of 0 A to 5000 A, preferably to 4000 A, in particular to 3000 A. A three-phase AC voltage in the medium voltage range of, for example, 6000 V to 33,000 V can be applied to the input of the transformer. A single-phase AC voltage of 0 to 3000 V, preferably of 2500 V, may be present at the input of the basic supply module.

The basic supply module may include means for identifying a ground fault.

The modular power supply arrangement according to the invention may include several identical or similar basic supply modules.

A modular power supply arrangement of the invention may include as a module of the different type a medium voltage supply module having at least one input for connection to a power mains or to the transformer for supplying electric energy, and outputs for connection to a corresponding load from the group of loads adapted to be supplied from the power mains with electric energy, and an interface, by which the power supply arrangement can be connected to the communication bus.

While the basic supply module supplies at the output of the power supply arrangement configured to supply power to the connected loads preferably a voltage of 0 V to 2000 V, preferably up to 2500 V, still higher voltages can be provided with a medium voltage supply module. For example, AC voltages of 0 V to 12,000 V, in particular to 8000 V, and AC currents of 0 A to 50 A, preferably to 20 A, may be provided at the outputs of the medium voltage supply module.

A medium voltage supply module of a power supply arrangement according to the invention can be supplied at its input with a three-phase AC voltage of 400 V from the power mains or a tap of a transformer. The medium voltage supply module may include at least one converter for increasing a voltage supplied at the input. A corresponding converter may be associated with each output of the medium voltage supply module.

The linked voltage across the outputs may be equal to 0 V at least during the time when the loads connected to the output of the medium voltage supply module are supplied with electric power. Two corresponding terminals may be associated with the outputs of the medium voltage supply module, wherein with the exception of two outer terminals all other inner terminals are associated with two outputs. The outer terminals of the medium voltage supply module are each connected with a respective terminal of the output of the basic supply module. The loads can then be concurrently connected in series to the output of a basic supply module, without allowing current flow from the medium voltage supply module to the output of the basic supply module.

The modular power supply arrangement may include several identical or similar medium voltage supply modules.

Similar in the context of the specification means that although the medium voltage modules may be different, at least the interfaces to the communication bus are identical and each medium voltage supply module has a dedicated connection to the grid.

Preferably, the number of medium voltage supply modules corresponds to the number of basic supply modules. The medium voltage supply modules and the basic supply modules may each be associated in pairs to a corresponding group of loads.

The modular power supply arrangement of the invention may include a medium frequency supply module which has at least one input for connection with a power mains or the transformer for supplying electric energy and outputs for connection to a corresponding load from the group of loads adapted to be supplied with electric energy from the power mains, and which includes an interface for connecting the power supply arrangement to the communication bus.

AC voltages of 0 V to 100 V, preferably 50 V, and AC currents of 0 A to 1500 A at with frequency of 2 kHz to 250 kHz, preferably from 20 kHz to 150 kHz, can be provided at the outputs of the medium frequency supply module.

The medium frequency supply module of a modular power supply arrangement may include one or several frequency converters for changing, in particular increasing, the frequency of a voltage from the power mains and supplied at the input.

A corresponding output of the medium frequency supply module may be associated with each output of one of the frequency converters. The linked voltage across a pair of outputs of the medium frequency supply modules may be equal to 0 V at least when the loads connected to the output of the medium frequency supply module are supplied with power.

Two respective terminals may be associated with the outputs of the medium frequency supply module, with each pair of outputs having two outer terminals and one inner terminal, wherein the outer terminals are associated with a corresponding one of the two outputs of the pair of outputs and the inner terminal is associated with two outputs of the pair of outputs.

A three-phase AC voltage of 200 V to 690 V, preferably of 400 V, can be supplied at the input of the medium frequency supply module between the two outer conductors from a power mains or from the transformer.

The modular power supply arrangement may include several identical or similar medium frequency supply modules. For connection to the communication bus, the similar medium frequency supply modules have at least interfaces that are identical to those of the other medium frequency supply modules, as well as mains connections. The number of the medium frequency supply modules may correspond to the number of the basic supply modules.

Advantageously, in a modular power supply arrangement according to the invention, the control module, basic supply module and optionally each medium frequency supply module are each arranged in a corresponding control cabinet. Each medium voltage supply module may be arranged in a control cabinet together with a basic supply module. Each control cabinet advantageously has a mains connection. Each module may have a connection to an auxiliary power supply. Each control cabinet may include a display unit, in particular a display screen.

Each module, with the exception of the control module, may have a decentralized control unit which is connected inside the module with, for example, recorders for measured variables, control terminals of controllable switching elements, for example thyristors and the like. The decentralized control units may be connected to the communication bus via the interfaces of the modules. The decentralized control units may be arranged downstream of the control module.

The power supply arrangement according to the invention is preferably suitable and configured to supply energy to an even number of loads and has therefore an even number of outputs.

An exemplary embodiment of a modular power supply arrangement according to the invention will now be described with reference to the figures.

BRIEF DESCRIPTION OF THE SEVERAL VIEWS OF THE DRAWING(S)

FIG. 1a, b shows a schematic circuit diagram of the modular power supply arrangement according to the invention, and FIG. 2 shows a schematic circuit diagram of a modular power supply arrangement with three basic supply modules.

DETAILED DESCRIPTION OF THE INVENTION

Figure 1B:
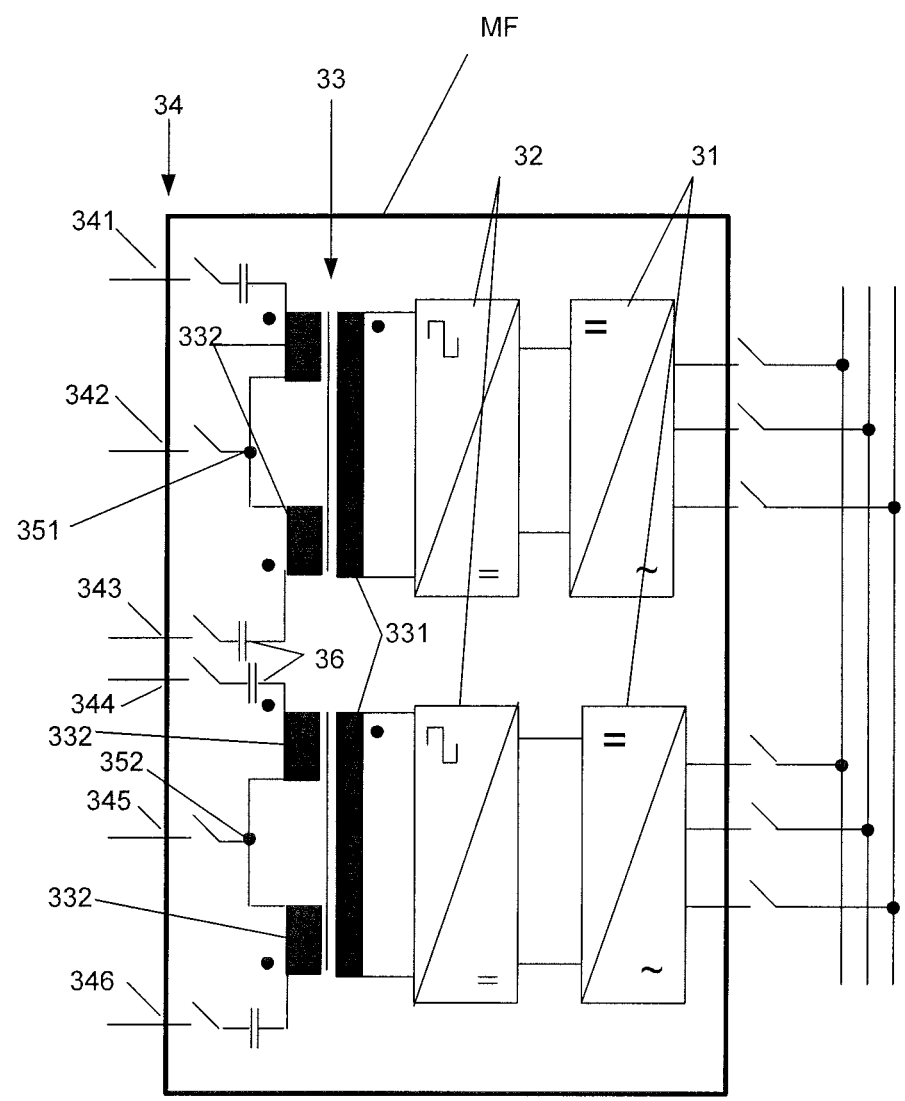

FIG. 1 shows the wiring connections of the modular power supply arrangement according to the invention, as well as a transformer 40, a basic supply module B, a medium voltage supply module MV and a medium frequency supply module MF. A control module and a communication bus are not illustrated. Also not illustrated are the control lines, the measured value recorder and the measured value lines located inside the basic supply module B, the medium voltage supply module MV and the medium frequency supply module MF, and the interfaces and interface driver circuits of the modules B, MV MF to the communication bus. Likewise, optional control units and/or driver or trigger circuits optionally arranged downstream of the control module and disposed in the basic supply module B, the medium voltage supply module MV and the medium frequency supply module MF are also not shown.

The basic supply module B of the modular power supply arrangement according to FIG. 1 includes a mains connection connected to a primary side of a transformer 40. The secondary side of the transformer 40 includes a plurality of first taps 401 to 406. Each of the first taps 401 to 406 is connected in the basic supply module B via two anti-parallel connected thyristors 11 or a triac with a node 12. The node 12 is connected, on one hand, to a first terminal 131 of the output of the basic supply module B. The node 12 can also be connected to ground via a controllable switch 141. The second tap 407 of the secondary side of the transformer 40 is connected to a terminal 132 of the output of the basic supply module B and can also be connected to ground via a controllable switch 142.

The largest possible voltage drop occurs between the first tap 401 and the second tap 407 of the secondary side of the transformer 40. Because the other first taps 402 to 406 are located between these two taps 401 and 407, the voltage drop between one of these first taps 402 to 406 and the second tap 407 is smaller than the largest possible voltage. Depending on which of the thyristor branches 111 to 116 is conducting, a higher or lower voltage is provided at the node 12 and hence at the terminal 131, provided that the switch 141 is open. The voltage between the highest possible voltage between the first tap 401 and the second tap 407 and the smallest voltage between the first tap 406 and the second tap 407 can be continuously adjusted by adjusting the firing angle of the thyristors or the phase angle.

A basic supply module B ensures supply of regulated or base load power to the silicon rods or thin silicon rods R1 to R4 which are connected in series to the basic supply module B between the terminals 131 and 132.

The output power of a Siemens reactor can be improved with the medium voltage supply module MV and the medium frequency supply module MF. Accordingly, the medium voltage supply module MV and the medium frequency supply module MF may be provided additionally in the modular switching arrangements.

The silicon rods or thin silicon rods R1 to R4 supplied with current from the basic supply module B are insulators at low temperatures, i.e., even at room temperature. The silicon rods or thin silicon rods R1 to R4 become conducting only through heating. The medium voltage supply module MV can be used to heat the silicon rods or thin silicon rods R1 to R4 at the beginning of the deposition process, so that they become conducting and can be supplied with current from the basic supply module B (dielectric heating). For this purpose, the outputs of the medium voltage supply module B supply higher voltages than the basic supply module B. A respective one of the silicon rods or thin silicon rods R1, R2, R3, R4 is connected at each of the outputs. Preferably, the medium voltage provided at the outputs has also a higher frequency of, for example, 5 kHz, than the mains frequency.

The medium voltage supply module MV shown in FIG. 1a has a total of four converters 20 which can be used to generate from a three-phase mains voltage a voltage with higher frequency. This voltage is then upconverted by the transformers 21 to a higher voltage of, for example, up to 12 kV. This medium voltage which has a higher frequency than the mains voltage is then supplied at the outputs of the medium voltage supply module MV. A respective one of the silicon rods or thin silicon rods R1, R2, R3, R4 is connected at each of the outputs.

The outputs 23 of the medium voltage supply module MV are linked with one another. For this reason, only five terminals 231 to 235 are provided for the illustrated four outputs. Of these five terminals, the terminals 232, 233 and 234 are used for two respective consecutive outputs of the chain, whereas the terminals 231 and 235 are used for one output located at the beginning and an end of the chain of outputs.

The voltages at the outputs of the medium voltage supply module MV are set so that the voltage drop across the entire chain of the outputs 23 is equal to 0 V. Accordingly, there is no voltage drop between the terminals 231 and 235 during operation of the medium voltage supply module MV. Because these terminals 231 and 235 are also located at the end of the series connection of the silicon rods or thin silicon rods R1 to R4 and because this series connection is connected to the output of a basic supply module B, there is no voltage present at the output of the basic supply module B which is generated by the medium voltage supply module MV during the operation of the medium voltage supply module MV.

Unlike the medium voltage supply module MV, the medium frequency supply module MF is used to supply a current to the silicon rods or thin silicon rods R1, R2, R3, R4 simultaneously with the basic supply module B. The medium frequency supply module MF provides at its outputs 34 a voltage with a higher frequency than the mains voltage or the output voltage of the basic supply module B.

The medium frequency supply module MF has two three-phase mains connections. Each of these mains connections is connected inside the medium frequency supply module MF to a corresponding frequency converter. Each frequency converter has two stages 31, 32. The first stages 31 convert the mains voltages to a corresponding DC voltage. The DC voltages are converted in the second stages 32 of the frequency converter to the higher-frequency AC voltages. These high-frequency AC voltages are supplied to the primary sides 331 of corresponding transformers 33. The magnetic flux in each of the transformers 33 passes on the secondary side through two coils 332. The secondary coils 332 of each of the two transformers 33 are identical. Each secondary coil 332 is connected in parallel with an output 34 of the medium frequency supply module MF. A respective one of the silicon rods or thin silicon rods R1, R2, R3, R4 is connected to each of the outputs 34. Each of two respective outputs 34 at linked with one another. These are the outputs 34 which receive a voltage from the same transformer 33, meaning that two taps of the secondary coil 332 are each connected with a respective terminal 341, 343, and 344, 346. The other two taps of the secondary coil 332 are each connected with a respective node 351 and 352. The nodes 351 and 352 are connected to the terminals 343 and 345. The secondary coil 332 of each transformer 32 can also be replaced by a secondary-side coil with a center tap located exactly at the center of the secondary coil of the transformer.

The magnitude of the voltage drops across the secondary coils 332 of each transformer 32 is identical. However, the voltages have the opposite polarity, because the winding sense of the two secondary coils 332 of each transformer 32 is reversed. Linking the outputs 34 associated with one transformer 32 results in a zero voltage drop between the terminals 341, 343, and 344, 346, respectively. Because the terminals 343, 344 are connected to each other at least via an electrically conducting connection between the silicon rods or thin silicon rods R2 and R3, there is also no voltage drop between the terminals 341 and 346 of the outputs 34 of the medium frequency supply module MF. Accordingly, zero current is supplied from the medium frequency module MF to the basic supply module B during the parallel operation with the basic supply module B, although the terminals 341 and 346 are connected to the terminals 131 and 132, respectively, of the basic supply module.

However, a current may still be supplied from the basic supply module B into the medium frequency supply module MF. This can be prevented by arranging between the coils on the secondary side of the transformers 32 and the terminals 341, 343, 344 and 346 a capacitor 36 which filters, i.e. blocks, the low-frequency current provided by the basic supply module. As a result, the medium frequency supply module MF is decoupled from the basic supply module B.

The three illustrated modules B, MV, MF are configured so that they can be operated independent from one another and that one module is not required for the other module. All modules have dedicated mains connections.

In addition to the mains connections for supplying power illustrated in the Figure, the auxiliary current supplies are separate from one another. The connections via the interface and a communication bus (not illustrated) to the unillustrated control module are also independent from one another.

The invention claimed is:

1. A modular power supply arrangement in a reactor producing polysilicon, the power supply comprising:
   a power mains;
   a central control module haying an input connected to the power mains supplying the central control module with electrical energy, the central control module including, at least one controller;
   at least one basic supply module haying at least one input supplying the basic supply module with electric energy; and the at least one basic supply module having at least one output connecting to a group of loads to receive electric energy from the power mains via the basic supply module; the basic supply module being controlled and/or regulated by the controller of the central control module; the basic supply module further including controllable switches, connected at least indirectly to the input and to the output of the basic supply module, the controllable switches increase or decrease the energy supplied by the power mains to the loads via the output, wherein each of the switches is switchable by the central control module between two states to form an open circuit and a closed circuit;
   a communication bus connected to the central control module and the basic supply module via an interface; and
   a voltage supply module supplying higher voltages than an output voltage of the power mains, the voltage supply module comprises at least one input connected to the power mains supplying electric energy or a transformer for supplying electric energy and outputs connected to one corresponding load from the group of loads; an interface connecting the voltage supply module to the communication bus; the voltage supply module further includes a plurality of converters for generating from the power mains at the input, of the voltage supply module a voltage of higher frequency; the voltage of higher frequency is upconverted by a plurality of transformers to produce a higher voltage than that of the power mains: wherein the plural transformers includes a first transformer, a second transformer, a third transformer, and a fourth transformer; each of the transformers having a plurality of outputs; the first and second transformers together represent a first pair of transformers, while the third and fourth transformers together represent a second pair of transformers; outputs of the plural transformers provide the outputs of the voltage supply module; linked voltages across the outputs of the voltage supply module are equal to 0 V at least during a time when loads connected to the outputs of the voltage supply module are supplied with electric power.

2. The modular power supply arrangement according to claim 1, wherein the outputs of the voltage supply module include two outer terminals and three inner terminals, the two outer terminals of the voltage supply module are each connected with a respective terminal of the output of the basic supply module.

3. The modular power supply arrangement according to claim 1, further comprising a transformer with plural secondary-side taps.

4. The modular power supply arrangement according to claim 3, wherein the taps of the transformer are each associated with a corresponding input of the basic supply module and a group of the controllable switches is associated with each input of the basic supply module adjusting the electric energy to be received via the input of the basic supply module.

5. The modular power supply arrangement according to claim 4, wherein groups of the controllable switches are connected to the inputs and to the output of the basic supply module without interconnection of additional switches.

6. The modular power supply arrangement according to claim 5, wherein a node is arranged between the groups of the controllable switches and the output of the basic supply module, wherein the node is connectable via an additional controllable switch to a reference potential.

7. The modular power supply arrangement according to claim 5, wherein the additional switches are mechanical switches.

8. The modular power supply arrangement according to claim 7, wherein the mechanical switches are contactors.

9. The modular power supply arrangement according to claim 3, wherein the group of loads is suppliable with electric energy drawn from the power mains via the transformer.

10. The modular power supply arrangement according to claim 1, wherein the modular power supply arrangement comprises several identical basic supply modules.

11. The modular power supply arrangement according to claim 1, wherein a corresponding converter is associated with each output of the voltage supply module.

12. The modular power supply arrangement according to claim 1, wherein the modular power supply arrangement comprises a frequency supply module supplying a voltage with a frequency higher than an output voltage of the power mains and higher than an output voltage of the basic supply module, the frequency supply module comprises at least one input connected to the power mains supplying electric energy and outputs connected to a corresponding load from the groups of loads, which load is supplied with electric energy received from the power mains, and an interface connecting the modular power supply arrangement with the communication bus.

13. The modular power supply arrangement according to claim 12, wherein the frequency supply module comprises one or more frequency converters increasing the frequency of a voltage of the power mains applied at the input.

14. The modular power supply arrangement according to claim 13, wherein a corresponding output of one of the frequency converters is associated with each output of the frequency supply module.

15. The modular power supply arrangement according to claim 12, wherein the linked voltage across a pair of outputs of the frequency supply module is equal to about 0 V at least when the loads connected to the outputs of the frequency supply module are supplied with electric power.

16. The modular power supply arrangement according to claim 12, wherein two corresponding terminals are associated with each of the outputs of the frequency supply module, with each pair of outputs having two outer terminals and one inner terminal, wherein the outer terminals are associated with a corresponding one of the two outputs of the pair of outputs and the inner terminal is associated with two outputs of the pair of outputs.

17. The modular power supply arrangement according to claim 12, wherein a three-phase AC voltage of approximately 200 V to approximately 600 V is supplied to the input of the frequency supply module.

18. The modular power supply arrangement according to claim 17, wherein the three-phase AC voltage is about 400 V.

19. The modular power supply arrangement according to claim 17, wherein the frequency supply module is a transformer.

20. The modular power supply arrangement according to claim 12, wherein the modular power supply arrangement comprises several identical frequency supply modules.

21. The modular power supply arrangement according to claim 20, wherein the number of the frequency supply modules corresponds to a number of the basic supply modules.

22. The modular power supply arrangement according to claim 1, further comprising control cabinets, and wherein the central control module and each basic supply module are arranged in a corresponding control cabinet.

23. The modular power supply arrangement according to claim 22, wherein each voltage supply module together with a basic supply module is arranged in a control cabinet.

24. The modular power supply arrangement according to claim 23, wherein each control cabinet comprises a connection to the power mains.

25. The modular power supply arrangement according to claim 22, wherein each control cabinet comprises a connection to the power mains.

26. The modular power supply arrangement according to claim 22, wherein each control cabinet has a display unit.

27. The modular power supply arrangement according to claim 26, wherein the display unit is a display screen.

28. The modular power supply arrangement according to claim 22, wherein the central control module, each basic supply module and each frequency supply module are arranged in a corresponding control cabinet.

29. The modular power supply arrangement according to claim 1, wherein each module has a connection to an auxiliary power supply.

30. The modular power supply arrangement according to claim 1, wherein the controllable switches are thyristors.

31. The modular power supply arrangement according to claim 1, wherein no voltage is present at the output of the basic supply module that is generated by the voltage supply module during operation of the voltage supply module.

32. The modular power supply arrangement according to claim 1, wherein in the first pair of transformers the first transformer has a secondary coil that is oppositely wound relative to a secondary coil of the second transformer.

* * * * *